(12) United States Patent
Koyama (10) Patent No.: US 12,359,399 B2
(45) Date of Patent: Jul. 15, 2025

(54) WORK VEHICLE AND METHOD FOR CONTROLLING WORK VEHICLE

(71) Applicant: Komatsu Ltd., Tokyo (JP)

(72) Inventor: Akihiro Koyama, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/715,811

(22) PCT Filed: Jan. 23, 2023

(86) PCT No.: PCT/JP2023/001901
§ 371 (c)(1),
(2) Date: Jun. 3, 2024

(87) PCT Pub. No.: WO2023/145684
PCT Pub. Date: Aug. 3, 2023

(65) Prior Publication Data
US 2025/0043543 A1    Feb. 6, 2025

(30) Foreign Application Priority Data
Jan. 31, 2022    (JP) ................. 2022-013626

(51) Int. Cl.
*E02F 9/22*     (2006.01)
*E02F 9/20*     (2006.01)
(Continued)

(52) U.S. Cl.
CPC .......... *E02F 9/2228* (2013.01); *E02F 9/2004* (2013.01); *E02F 9/2025* (2013.01);
(Continued)

(58) Field of Classification Search
CPC ..... E02F 9/2253; E02F 9/2228; E02F 9/2025; F15B 21/00
See application file for complete search history.

(56) References Cited

U.S. PATENT DOCUMENTS

| 8,769,945 B2 | 7/2014 | Shirao et al. |
| 2012/0152641 A1 | 6/2012 | Takahashi et al. |

(Continued)

FOREIGN PATENT DOCUMENTS

| JP | 2011-052794 A | 3/2011 |
| JP | 2014-037881 A | 2/2014 |
| JP | 2019-143770 A | 8/2019 |

*Primary Examiner* — Abiy Teka
(74) *Attorney, Agent, or Firm* — Troutman Pepper Locke LLP; James E. Armstrong, IV; Joshua L. Jones (57) ABSTRACT

A method for controlling a work vehicle including a pump driven by a power source, a cylinder controlling a displacement of the pump based on a pressure of supplied hydraulic fluid and switching a discharge direction of the hydraulic fluid from the pump based on a supply direction of the supplied hydraulic fluid, and a valve switching the supply direction of the hydraulic fluid to the cylinder, the method includes: detecting a vehicle speed of the work vehicle; receiving a command signal from a second operation device operated to switch between forward travel and reverse travel of the work vehicle; determining whether a shuttle shift operation is performed based on the vehicle speed and the command signal; and controlling the valve based on an operation amount of a first operation device operated by an operator to control the power source when the shuttle shift operation is determined to be performed.

3 Claims, 6 Drawing Sheets

(51) Int. Cl.
 *F15B 13/04* (2006.01)
 *F15B 21/00* (2006.01)
(52) U.S. Cl.
 CPC ........ *E02F 9/2296* (2013.01); *F15B 13/0401* (2013.01); *F15B 21/00* (2013.01); *E02F 9/2285* (2013.01); *E02F 9/2292* (2013.01); *F15B 2211/327* (2013.01)

(56) References Cited

U.S. PATENT DOCUMENTS

2016/0257538 A1\* 9/2016 Oiwa .................. B66F 9/07572
2020/0199850 A1\* 6/2020 Oasa ..................... F16H 61/425

\* cited by examiner

WORK VEHICLE AND METHOD FOR CONTROLLING WORK VEHICLE

FIELD

The present disclosure relates to a work vehicle and a method for controlling a work vehicle.

BACKGROUND

Work vehicles such as a wheel loader equipped with a hydraulic static transmission (HST) have been known. An HST-type work vehicle drives a hydraulic pump by an engine, and drives a travel hydraulic motor by hydraulic fluid discharged from the hydraulic pump. As a result, the work vehicle travels. In such an HST-type work vehicle, a vehicle speed and a travel direction can be controlled by controlling an engine rotation speed, a displacement of the hydraulic pump, a displacement of the travel hydraulic motor, a discharge direction of the hydraulic fluid, and the like.

CITATION LIST

Patent Literature

Patent Literature 1: JP 2014-037881 A

SUMMARY

Technical Problem

Meanwhile, in a work vehicle such as a wheel loader, for example, an operation (shuttle shift) of changing the travel direction without completely stopping the work vehicle to quickly change the travel direction of the work vehicle is known. In the conventional work vehicle, control of a pressure control valve and control of a forward/reverse switching control valve are the same regardless of an operation amount of an accelerator during the shuttle shift. For this reason, there is a case where deceleration until the vehicle speed is reversed does not match deceleration desired by an operator.

An object of the present disclosure is to adjust deceleration in accordance with an operation of an operator during a shuttle shift.

Solution to Problem

According to an aspect of the present invention, a work vehicle comprises: a power source; a hydraulic pump driven by the power source; a pump displacement control cylinder that controls a displacement of the hydraulic pump in accordance with a pressure of supplied hydraulic fluid and switches a discharge direction of the hydraulic fluid from the hydraulic pump in accordance with a supply direction of the supplied hydraulic fluid; a forward/reverse switching valve that switches the supply direction of the hydraulic fluid to the pump displacement control cylinder; a vehicle speed sensor that detects a vehicle speed of the work vehicle; a first operation device operated to control the power source; a second operation device operated to switch forward travel and reverse travel of the work vehicle; and a controller, wherein the controller determines whether or not a shuttle shift operation is performed based on the vehicle speed detected by the vehicle speed sensor and a command signal from the second operation device, and controls the forward/reverse switching valve based on an operation amount of the first operation device when determining that the shuttle shift operation is performed.

According to another aspect of the present invention, a method for controlling a work vehicle, which includes a power source, a hydraulic pump driven by the power source, a pump displacement control cylinder that controls a displacement of the hydraulic pump in accordance with a pressure of supplied hydraulic fluid and switches a discharge direction of the hydraulic fluid from the hydraulic pump in accordance with a supply direction of the supplied hydraulic fluid, and a forward/reverse switching valve that switches the supply direction of the hydraulic fluid to the pump displacement control cylinder, the method comprising: detecting a vehicle speed of the work vehicle; receiving a command signal from a second operation device operated to switch between forward travel and reverse travel of the work vehicle; determining whether or not a shuttle shift operation is performed based on the vehicle speed of the work vehicle and the command signal from the second operation device; and controlling the forward/reverse switching valve based on an operation amount of a first operation device operated by an operator to control the power source when it is determined that the shuttle shift operation is performed.

Advantageous Effects of Invention

According to the present disclosure, the deceleration can be adjusted in accordance with the operation of the operator during the shuttle shift.

BRIEF DESCRIPTION OF DRAWINGS

FIG. 5($a$)-($e$) are time charts illustrating an example of control during a shuttle shift.

DESCRIPTION OF EMBODIMENTS

Hereinafter, embodiments of the present invention will be described with reference to the drawings, but the present disclosure is not limited to the embodiments. Components of the embodiments to be described below can be combined as appropriate. In addition, there is also a case where some components are not used.

<Work Vehicle>

Figure 1:
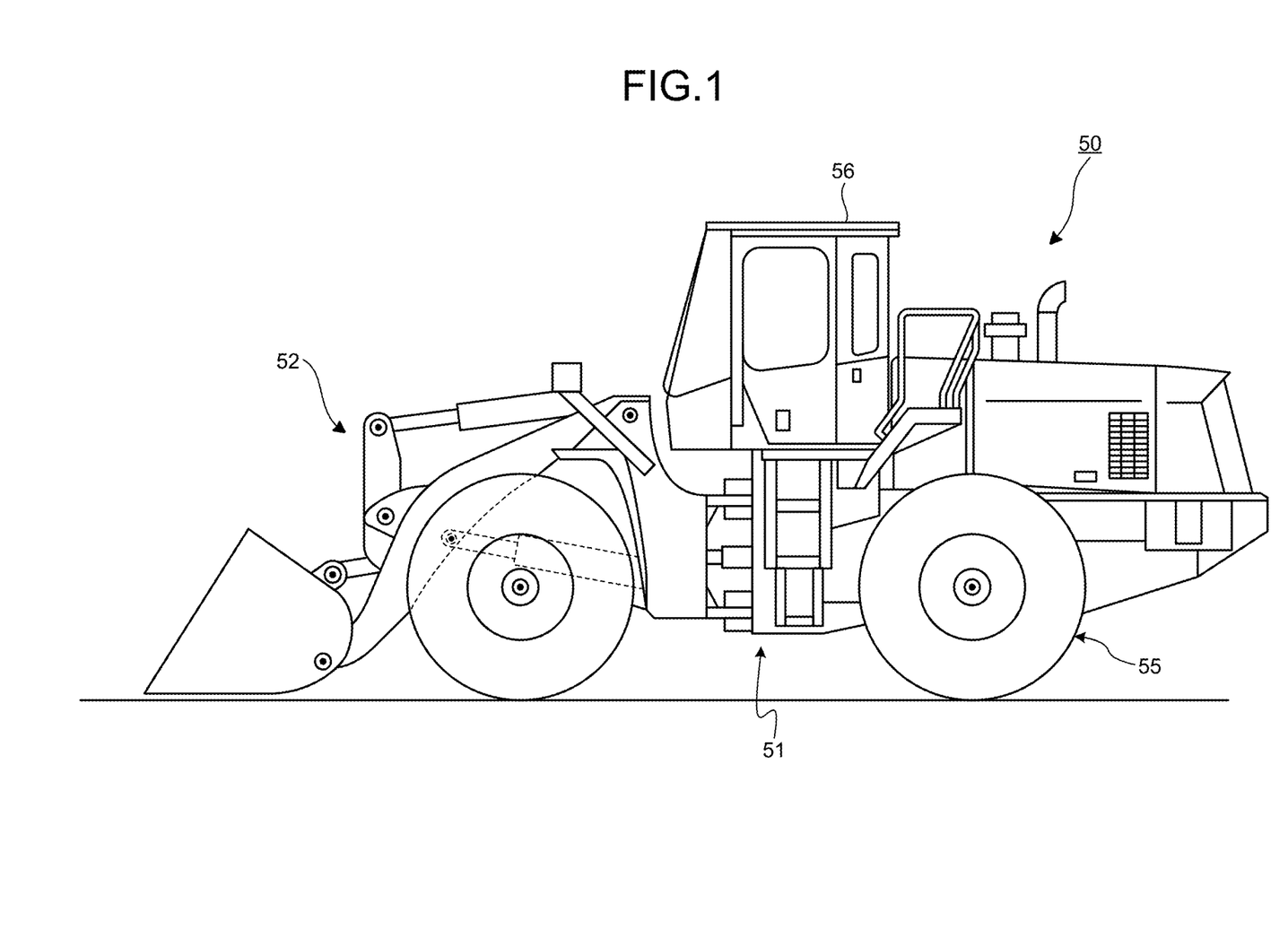
FIG. 1 is a side view illustrating a work vehicle according to an embodiment.

FIG. 1 is a side view illustrating a work vehicle 50 according to an embodiment. In the embodiment, the work vehicle 50 is, for example, a wheel loader. In the following description, the work vehicle 50 is appropriately referred to as a wheel loader 50. The wheel loader 50 includes a vehicle body 51, a cab 56 supported by the vehicle body 51, wheels 55 causing the wheel loader 50 to travel, and working equipment 52 that is operably supported by the vehicle body 51 and performs predetermined work. The wheel loader 50 includes a display unit 57 in the cab 56.

The wheel loader 50 includes a travel system 30 including a controller 12 and the like.

<Travel System>

Figure 2:
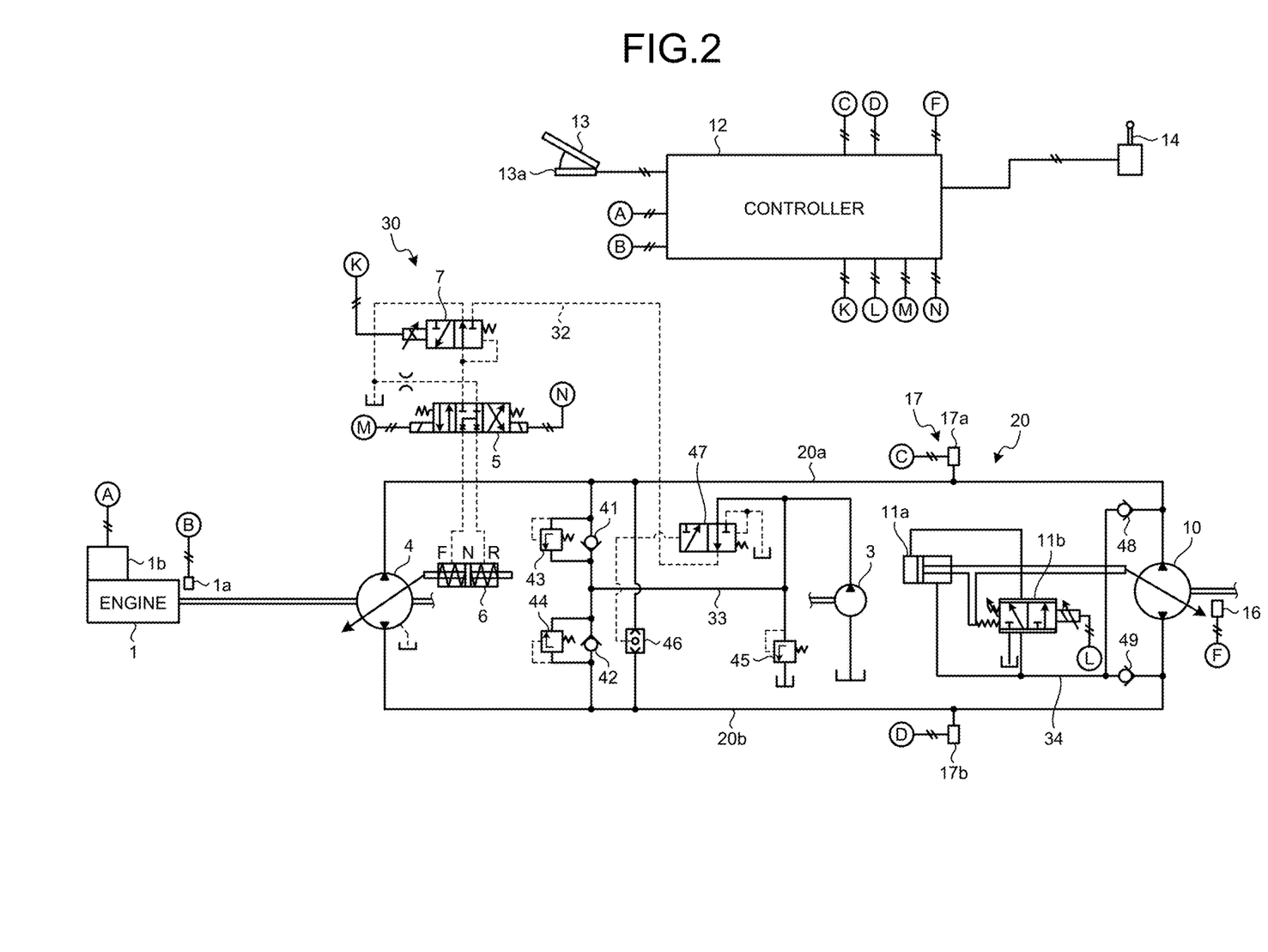
FIG. 2 is a diagram illustrating a travel system mounted on the work vehicle according to the embodiment.

FIG. 2 is a diagram illustrating the travel system 30 mounted on the wheel loader 50 according to the embodiment. The travel system 30 includes a power source 1, a charge pump 3, a travel hydraulic pump 4 that is an HST pump, a travel hydraulic motor 10 that is an HST motor, the controller 12, and a hydraulic circuit 20. Although an HST system having one pump and one motor will be described as an example of the travel system 30 in the embodiment, the number of pumps and motors is not limited thereto. The hydraulic circuit 20 includes a first circuit 20a and a second circuit 20b. In the travel system 30, hydraulic fluid is discharged from the travel hydraulic pump 4 driven by the power source 1, and the travel hydraulic motor 10 is driven by the hydraulic fluid discharged from the travel hydraulic pump 4. Then, the travel hydraulic motor 10 rotationally drives the wheels 55, whereby the wheel loader 50 travels.

The power source 1 supplies power for driving the wheel loader 50. In the embodiment, the power source 1 is, for example, an engine. In the following description, the power source 1 is appropriately referred to as an engine 1. The engine 1 outputs power to, for example, the charge pump 3, the travel hydraulic pump 4, and the like. The engine 1 is provided with an engine rotation speed sensor 1a that detects an actual rotation speed of the engine 1. A fuel injection device 1b is connected to the engine 1. The engine 1 is controlled by an engine controller to be described later.

The travel hydraulic pump 4 is driven by the engine 1 to discharge the hydraulic fluid. The travel hydraulic pump 4 is a variable displacement hydraulic pump. The hydraulic fluid discharged from the travel hydraulic pump 4 is supplied to the travel hydraulic motor 10 via the hydraulic circuit 20. The travel hydraulic pump 4 can change a discharge direction of the hydraulic fluid. When the hydraulic fluid is supplied from the travel hydraulic pump 4 to the travel hydraulic motor 10 via the first circuit 20a, the travel hydraulic motor 10 is driven in one direction, for example, the forward direction. When the hydraulic fluid is supplied from the travel hydraulic pump 4 to the travel hydraulic motor 10 via the second circuit 20b, the travel hydraulic motor 10 is driven in the other direction, for example, the reverse direction. A forward/reverse switching valve 5 and a pump displacement control cylinder 6, which are configured to control the discharge direction of the travel hydraulic pump 4, are connected to the travel hydraulic pump 4.

The hydraulic circuit 20 is provided with a pressure detection unit 17. The pressure detection unit 17 detects a circuit pressure of the first circuit 20a or the second circuit 20b. The pressure detection unit 17 includes a first circuit pressure sensor 17a and a second circuit pressure sensor 17b. The first circuit pressure sensor 17a detects a hydraulic pressure of the first circuit 20a. The second circuit pressure sensor 17b detects a hydraulic pressure of the second circuit 20b. The first circuit pressure sensor 17a and the second circuit pressure sensor 17b output detection signals to the controller 12.

The forward/reverse switching valve 5 is an electromagnetic control valve that switches a supply direction of the hydraulic fluid with respect to the pump displacement control cylinder 6 based on a command signal from the controller 12. The forward/reverse switching valve 5 is switched between a forward position and a reverse position respectively corresponding to forward travel and reverse travel of the vehicle. The forward/reverse switching valve 5 switches the discharge direction of the travel hydraulic pump 4 by switching the supply direction of the hydraulic fluid with respect to the pump displacement control cylinder 6. The forward/reverse switching valve 5 switches the discharge direction of the travel hydraulic pump 4 between discharge to the first circuit 20a and discharge to the second circuit 20b.

The pump displacement control cylinder 6 is driven by being supplied with the hydraulic fluid via a pump pilot circuit 32, and changes a tilt angle of the travel hydraulic pump 4. The pump displacement control cylinder 6 controls a displacement of the travel hydraulic pump 4 in accordance with a pump pilot pressure that is a pressure of the hydraulic fluid supplied to the pump displacement control cylinder 6 via the pump pilot circuit 32. The pump displacement control cylinder 6 switches the discharge direction of the hydraulic fluid from the travel hydraulic pump 4 in accordance with the supply direction of the hydraulic fluid supplied from the forward/reverse switching valve 5.

A pressure control valve 7 is disposed in the pump pilot circuit 32. The pressure control valve 7 connects the pump displacement control cylinder 6 to either the pump pilot circuit 32 or a hydraulic fluid tank. The pressure control valve 7 is an electromagnetic control valve controlled based on a command signal from the controller 12. The pressure control valve 7 adjusts the tilt angle of the travel hydraulic pump 4 by controlling the pump pilot pressure. The control of the pressure control valve 7 by the controller 12 will be described later.

The pump pilot circuit 32 is connected to a charge circuit 33 and the hydraulic fluid tank via a cutoff valve 47. A pilot port of the cutoff valve 47 is connected to the first circuit 20a and the second circuit 20b via a shuttle valve 46. The shuttle valve 46 introduces a larger one of the hydraulic pressure of the first circuit 20a and the hydraulic pressure of the second circuit 20b into the pilot port of the cutoff valve 47. As a result, a drive circuit pressure is applied to the pilot port of the cutoff valve 47.

The charge pump 3 is a pump that is driven by the engine 1 and supplies the hydraulic fluid to the hydraulic circuit 20. The charge pump 3 is connected to the charge circuit 33. The charge pump 3 supplies the hydraulic fluid to the pump pilot circuit 32 via the cutoff valve 47.

The travel hydraulic motor 10 is a variable displacement hydraulic motor. The travel hydraulic motor 10 is driven by the hydraulic fluid discharged from the travel hydraulic pump 4. The travel hydraulic motor 10 is a travel motor that generates a driving force for rotating the wheels 55. A direction in which the travel hydraulic motor 10 is driven is changed between the forward direction and the reverse direction in accordance with the discharge direction of the hydraulic fluid from the travel hydraulic pump 4.

The travel hydraulic motor 10 is provided with a motor cylinder 11a and a motor displacement control unit 11b. The motor cylinder 11a changes a tilt angle of the travel hydraulic motor 10. The motor displacement control unit 11b is an electromagnetic control valve controlled based on a command signal from the controller 12. The motor displacement control unit 11b controls the motor cylinder 11a based on the command signal from the controller 12.

The motor cylinder 11a and the motor displacement control unit 11b are connected to a motor pilot circuit 34. The motor pilot circuit 34 is connected to the first circuit 20a via a check valve 48. The check valve 48 allows flow of the hydraulic fluid from the first circuit 20a to the motor pilot circuit 34, and regulates flow of the hydraulic fluid from the motor pilot circuit 34 to the first circuit 20a. The motor pilot circuit 34 is connected to the second circuit 20b via a check valve 49. The check valve 49 allows flow of the hydraulic fluid from the second circuit 20b to the motor pilot circuit 34, and regulates flow of the hydraulic fluid from the motor pilot circuit 34 to the second circuit 20b. By the check valve 48 and the check valve 49, the hydraulic fluid having the hydraulic pressure that is the larger one of the first circuit 20a and the second circuit 20b, that is, the drive circuit pressure is supplied to the motor pilot circuit 34.

The motor displacement control unit 11b switches a supply direction and a supply flow rate of the hydraulic fluid from the motor pilot circuit 34 to the motor cylinder 11a based on a command signal from the controller 12. As a result, the controller 12 can arbitrarily change a displacement of the travel hydraulic motor 10. In addition, a maximum displacement and a minimum displacement of the travel hydraulic motor 10 can be arbitrarily set.

The travel system 30 is provided with a vehicle speed sensor 16. The vehicle speed sensor 16 detects a vehicle speed. The vehicle speed sensor 16 outputs a vehicle speed signal to the controller 12. The vehicle speed sensor 16 detects the vehicle speed by detecting a rotation speed of a tire drive shaft, for example.

The wheel loader 50 includes an accelerator operation device (first operation device) 13 and a forward/reverse operation device (second operation device) 14.

The accelerator operation device 13 is operated by an operator to control the power source 1. In the embodiment, the accelerator operation device 13 is a device configured to allow the operator to set a target engine rotation speed. The accelerator operation device 13 is, for example, an accelerator pedal. The accelerator operation device 13 includes an accelerator operation amount sensor 13a. The accelerator operation amount sensor 13a includes, for example, a potentiometer. The accelerator operation amount sensor 13a outputs an operation signal indicating an operation amount of the accelerator operation device 13 to the controller 12. The operator adjusts the operation amount of the accelerator operation device 13 to control the rotation speed of the engine 1.

The forward/reverse operation device 14 is operated by the operator to switch a travel direction of the vehicle. The forward/reverse operation device 14 is a device configured to allow the operator to select a travel direction of the wheel loader 50. When the operator operates the forward/reverse operation device 14, the forward/reverse operation device 14 outputs a command signal for switching the travel direction of the wheel loader 50 to the controller 12. In the embodiment, an operation position of the forward/reverse operation device 14 is switched among a forward position, a reverse position, and a neutral position. The forward/reverse operation device 14 outputs a position signal indicating the operation position of the forward/reverse operation device 14 to the controller 12.

<Control System>

The controller 12 is an electronic control unit including a computing device such as a central processing unit (CPU), various memories, and the like. The controller 12 is electrically connected to each of the accelerator operation amount sensor 13a, the forward/reverse operation device 14, the vehicle speed sensor 16, the display unit 57, the pressure control valve 7, and the forward/reverse switching valve 5. The controller 12 receives the operation signal from the accelerator operation amount sensor 13a, the position signal from the forward/reverse operation device 14, and the vehicle speed signal from the vehicle speed sensor 16.

The controller 12 controls the fuel injection device 1b in accordance with the set target engine rotation speed to control an output torque and an output rotation speed of the engine 1.

Figure 3:
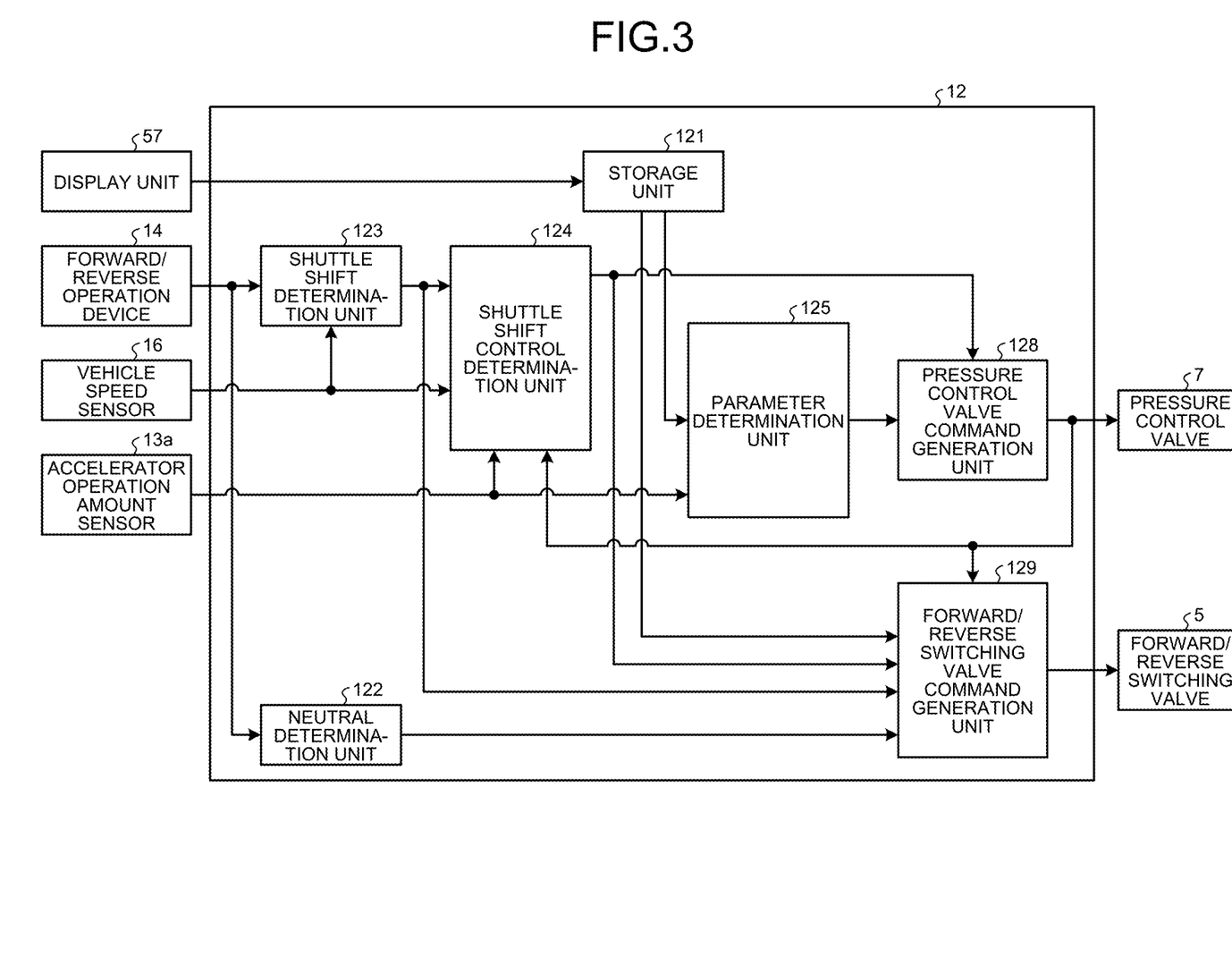
FIG. 3 is a functional block diagram including an HST controller mounted on the work vehicle according to the embodiment.
Figure 4:
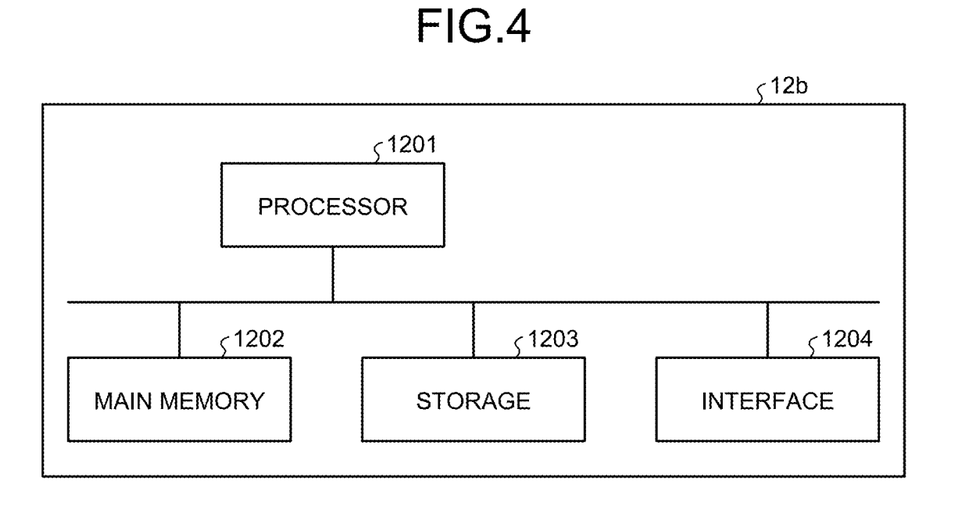
FIG. 4 is a block diagram illustrating the HST controller mounted on the work vehicle according to the embodiment.

FIG. 3 is a functional block diagram including the controller 12 mounted on the wheel loader 50 according to the embodiment. FIG. 4 is a block diagram illustrating the controller 12 mounted on the wheel loader 50 according to the embodiment. The controller 12 includes a computer system. The controller 12 outputs a command signal for controlling the wheel loader 50.

When determining that a shuttle shift operation is performed, the controller 12 controls a switching timing of the forward/reverse switching valve 5 based on the operation amount of the accelerator operation device 13 and the vehicle speed. More specifically, the controller 12 controls the pressure control valve 7 and controls the forward/reverse switching valve 5 based on parameter setting information, the position signal from the forward/reverse operation device 14, the vehicle speed signal from the vehicle speed sensor 16, the operation signal from the accelerator operation amount sensor 13a, and the like.

In the embodiment, when determining that the shuttle shift operation is performed, the controller 12 generates the command signal for controlling the pressure control valve 7 based on the operation amount of the accelerator operation device 13.

As illustrated in FIG. 4, the controller 12 includes a processor 1201, a main memory 1202, a storage 1203, and an interface 1204. The processor 1201 executes a computer program to perform computational processing of the operation of the travel system 30. The processor 1201 is, for example, a central processing unit (CPU) or a micro processing unit (MPU). The main memory 1202 is, for example, a non-volatile memory or a volatile memory. An example of the non-volatile memory is a read only memory (ROM). As the volatile memory, a random access memory (RAM) is used. The storage 1203 is a non-transitory tangible storage medium. The storage 1203 is, for example, a magnetic disk, a magneto-optical disk, a semiconductor memory, or the like. The storage 1203 may be an internal medium directly connected to a bus of the controller 12 or an external medium connected to the controller 12 via the interface 1204 or a communication line. The storage 1203 stores the computer program for controlling the travel system 30. Note that the controller 12 is not limited to a single unit, and may be divided into a plurality of controllers.

As illustrated in FIG. 3, the controller 12 includes a storage unit 121, a neutral determination unit 122, a shuttle shift determination unit 123, a shuttle shift control determination unit 124, a parameter determination unit 125, a pressure control valve command generation unit 128, and a forward/reverse switching valve command generation unit 129.

The storage unit 121 stores the parameter setting information.

The neutral determination unit 122 determines whether or not an operation of the forward/reverse operation device 14 is a neutral operation. For example, in a case where the position signal from the forward/reverse operation device 14 indicates the neutral position continuously for a predetermined time or more, the neutral determination unit 122 determines that the operation is the neutral operation.

The shuttle shift determination unit 123 determines whether or not the shuttle shift operation is performed. The shuttle shift determination unit 123 determines whether or not the shuttle shift operation is performed based on the position signal from the forward/reverse operation device 14 and the vehicle speed signal from the vehicle speed sensor 16. More specifically, when detecting that the forward/reverse operation device 14 is switched from the forward position to the reverse position during forward travel of the wheel loader 50, the shuttle shift determination unit 123 determines that a shuttle shift operation from forward travel to reverse travel is performed. When detecting that the forward/reverse operation device 14 is switched from the reverse position to the forward position during reverse travel of the wheel loader 50, the shuttle shift determination unit 123 determines that a shuttle shift operation from reverse travel to forward travel is performed.

The shuttle shift control determination unit 124 outputs a command signal (shuttle shift command) for starting shuttle shift control based on the operation signal from the accelerator operation amount sensor 13a, the vehicle speed signal from the vehicle speed sensor 16, a determination result of the shuttle shift determination unit 123, and the command signal from the pressure control valve command generation unit 128. For example, when the shuttle shift determination unit 123 determines that the shuttle shift operation from forward travel to reverse travel is performed, the shuttle shift control determination unit 124 outputs the shuttle shift command to start shuttle shift control from the forward position to the reverse position. For example, when the shuttle shift determination unit 123 determines that the shuttle shift operation from reverse travel to forward travel is performed, the shuttle shift control determination unit 124 outputs the shuttle shift command to start shuttle shift control from the reverse position to the forward position.

The parameter determination unit 125 determines a parameter for generating the command signal for controlling the pressure control valve 7. The parameter determination unit 125 determines the parameter for generating the command signal for controlling the pressure control valve 7 based on the operation signal from the accelerator operation amount sensor 13a and the parameter setting information stored in the storage unit 121. The parameter setting information may be stored in advance in the storage unit 121, or may be set by the operator through the display unit 57 in the cab 56, for example. Alternatively, the parameter setting information may be input through, for example, the external medium connected via the communication line, a USB memory, or the like.

The pressure control valve command generation unit 128 generates a command signal (pressure control valve command) for controlling the pressure control valve 7. The pressure control valve command generation unit 128 generates the pressure control valve command based on the shuttle shift command from the shuttle shift control determination unit 124 and the parameter determined by the parameter determination unit 125. The pressure control valve command generation unit 128 outputs the generated pressure control valve command to the pressure control valve 7.

The forward/reverse switching valve command generation unit 129 generates a command signal (forward/reverse switching valve command) for controlling the forward/reverse switching valve 5. The forward/reverse switching valve command generation unit 129 generates the forward/reverse switching valve command based on the parameter setting information stored in the storage unit 121, a determination result of the neutral determination unit 122, a determination result of the shuttle shift determination unit 123, the shuttle shift command from the shuttle shift control determination unit 124, and the pressure control valve command generated by the pressure control valve command generation unit 128. The forward/reverse switching valve command generation unit 129 outputs the generated forward/reverse switching valve command to the forward/reverse switching valve 5.

FIG. 5(a)-(e) are time charts illustrating an example of control when the shuttle shift operation from reverse travel to forward travel is performed at a predetermined vehicle speed. The time charts of FIG. 5(a)-(e) illustrate three different patterns. In the parameter setting information of the storage unit 121, for example, a cutoff frequency for generating a waveform as illustrated in FIG. 5(b) is stored.

FIG. 5(a) is an example of the shuttle shift command output from the shuttle shift control determination unit 124. The shuttle shift command illustrated in FIG. 5(a) changes depending on the operation amount of the accelerator operation device 13. Shuttle shift command 1 indicated by a broken line is, for example, a command signal in a case where the operation amount of the accelerator operation device 13 is 100%. Shuttle shift command 2 indicated by an alternate long and short dash line is, for example, a command signal in a case where the operation amount of the accelerator operation device 13 is 50%. Shuttle shift command 3 indicated by a solid line is, for example, a command signal in a case where the operation amount of the accelerator operation device 13 is 0%. In the example illustrated in FIG. 5(a), a command time, which is a time at which the shuttle shift command is turned from ON to OFF, changes depending on the operation amount of the accelerator operation device 13.

FIG. 5(b) is an example of the pressure control valve command generated by the pressure control valve command generation unit 128. The pressure control valve command illustrated in FIG. 5(b) changes depending on the shuttle shift command from the shuttle shift control determination unit 124 and the parameter determined by the parameter determination unit 125. The pressure control valve command is generated based on the operation amount of the accelerator operation device 13 and the parameter setting information stored in the storage unit 121. That is, the pressure control valve command changes based on the operation amount of the accelerator operation device 13. Pressure control valve command 1 indicated by a broken line is a command signal corresponding to Shuttle shift command 1. Pressure control valve command 2 indicated by an alternate long and short dash line is a command signal corresponding to Shuttle shift command 2. Pressure control valve command 3 indicated by a solid line is a command signal corresponding to Shuttle shift command 3. In the example illustrated in FIG. 5(b), when the shuttle shift command is turned ON, the pressure control valve command in which a command current value gradually decreases is generated. In the example illustrated in FIG. 5(b), when the shuttle shift command is turned OFF, the pressure control valve command in which the command current value gradually increases is generated.

Figure 5:
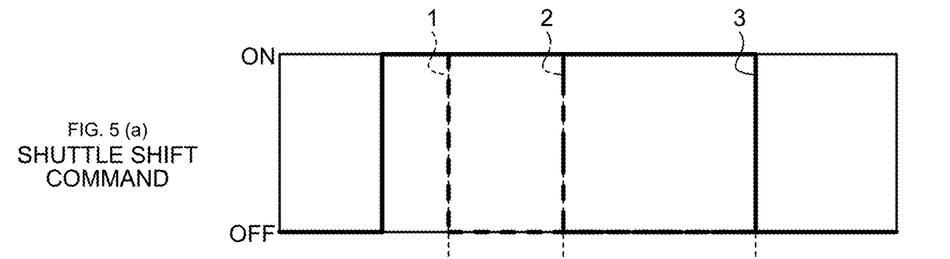

FIG. 5(c) is an example of the forward/reverse switching valve command generated by the forward/reverse switching valve command generation unit 129. The forward/reverse switching valve command illustrated in FIG. 5(c) is changed by the shuttle shift command from the shuttle shift control determination unit 124 or the pressure control valve command generated by the pressure control valve command generation unit 128. That is, the forward/reverse switching valve command illustrated in FIG. 5(c) changes depending on the operation amount of the accelerator operation device 13. Forward/reverse switching valve command 1 indicated by a broken line is a command signal corresponding to Pressure control valve command 1. Forward/reverse switching valve command 2 indicated by an alternate long and short dash line is a command signal corresponding to Pressure control valve command 2. Forward/reverse switching valve command 3 indicated by a solid line is a command signal corresponding to Pressure control valve command 3. In the example illustrated in FIG. 5(*c*), the forward/reverse switching valve command switches the forward/reverse switching valve 5 when the pressure control valve command illustrated in FIG. 5(*b*) is equal to or less than a threshold X. The forward/reverse switching valve command may be a command for switching the forward/reverse switching valve 5 when the shuttle shift command is turned OFF.

FIG. 5(*d*) is an example of a pump displacement corresponding to FIGS. 5(*b*) and 5(*c*). FIG. 5(*e*) is an example of a vehicle speed corresponding to FIG. 5(*d*).

In this manner, it can be seen from FIG. 5(*a*)-(*e*) that the pressure control valve command, the forward/reverse switching valve command, the pump displacement, and the vehicle speed change depending on the operation amount of the accelerator operation device 13. As a result, the operator adjusts the deceleration by operating the accelerator operation device 13 during the shuttle shift operation.

<Control Method>

Figure 6:
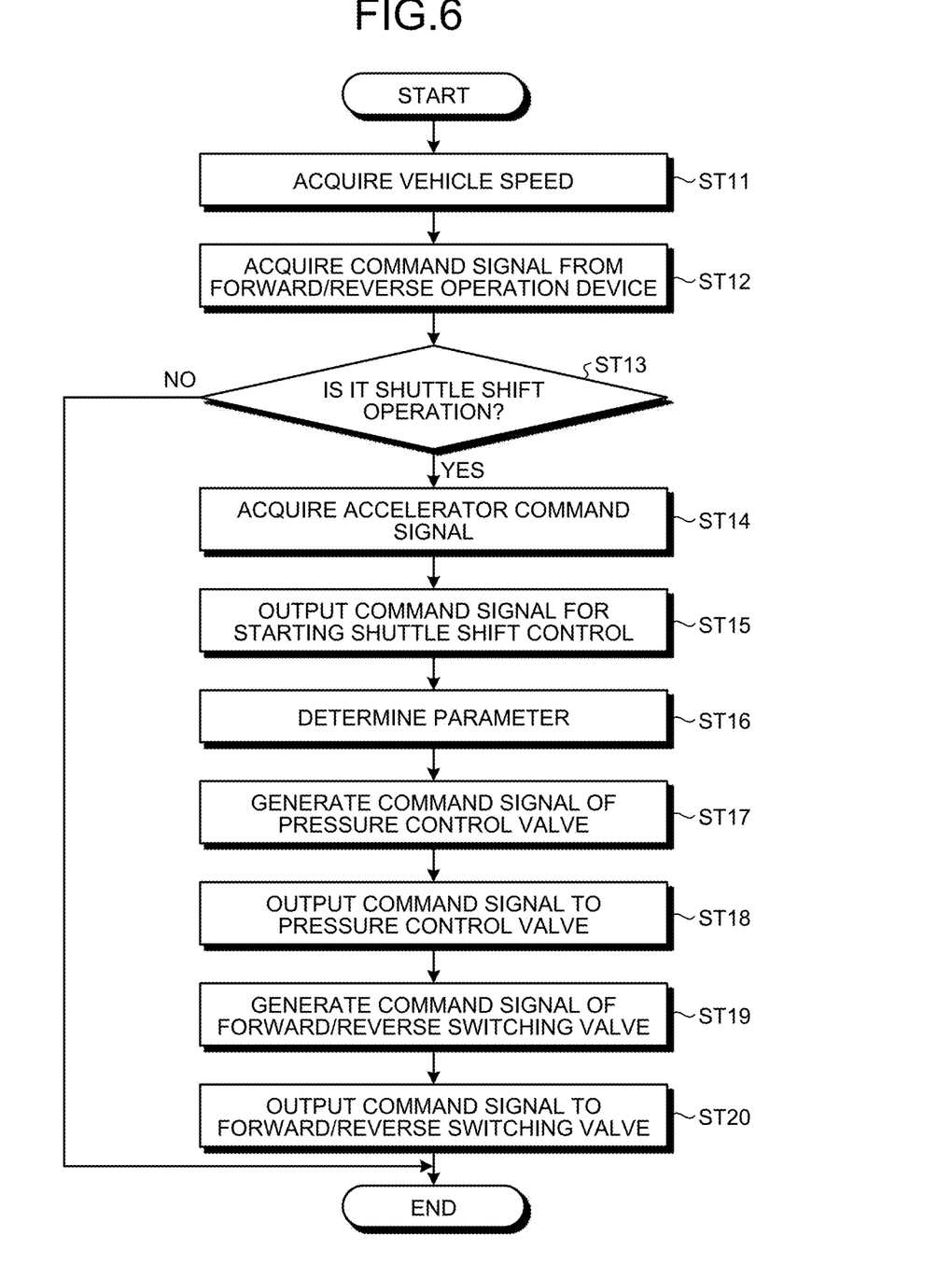
FIG. 6 is a flowchart illustrating an example of a control method during the shuttle shift.

FIG. 6 is a flowchart illustrating an example of a control method during the shuttle shift operation. The controller 12 acquires the vehicle speed (Step ST11). More specifically, the controller 12 receives the vehicle speed signal input from the vehicle speed sensor 16.

The controller 12 acquires the command signal from the forward/reverse operation device 14 (Step ST12). More specifically, the controller 12 acquires the position signal indicating the operation position of the forward/reverse operation device 14.

The controller 12 determines whether or not it is the shuttle shift operation (Step ST13). More specifically, the controller 12 causes the shuttle shift determination unit 123 to determine whether it is the shuttle shift operation from forward travel to reverse travel or the shuttle shift operation from reverse travel to forward travel. In the case of the shuttle shift from forward travel to reverse travel or the shuttle shift from reverse travel to forward travel, it is determined that the shuttle shift operation is performed. When determining that it is the shuttle shift operation (Yes in Step ST13), the controller 12 proceeds to Step ST14. When determining that it is not the shuttle shift operation (No in Step ST13), the controller 12 ends the processing.

When determining that it is the shuttle shift operation (Yes in Step ST13), the controller 12 acquires the operation amount of the accelerator operation device 13 (Step ST14). More specifically, the controller 12 acquires the operation signal indicating the operation amount of the accelerator operation device 13 from the accelerator operation amount sensor 13*a*.

The controller 12 outputs the command signal for starting the shuttle shift control (Step ST15). More specifically, the controller 12 causes the shuttle shift control determination unit 124 to output the shuttle shift command as in the example illustrated in FIG. 5(*a*) based on the operation signal from the accelerator operation amount sensor 13*a*, the vehicle speed signal from the vehicle speed sensor 16, the determination result of the shuttle shift determination unit 123, and the command signal from the pressure control valve command generation unit 128.

The controller 12 determines the parameter for generating the command signal for controlling the pressure control valve 7 (Step ST16). More specifically, the controller 12 causes the parameter determination unit 125 to determine the parameter for generating the pressure control valve command based on the operation signal from the accelerator operation amount sensor 13*a* and the parameter setting information stored in the storage unit 121.

The controller 12 generates the command signal for controlling the pressure control valve 7 (Step ST17). More specifically, the controller 12 causes the pressure control valve command generation unit 128 to generate the pressure control valve command as in the example illustrated in FIG. 5(*b*) based on the parameter determined by the parameter determination unit 125.

The controller 12 outputs the command signal to the pressure control valve 7 (Step ST18). More specifically, the controller 12 causes the pressure control valve command generation unit 128 to output the pressure control valve command to the pressure control valve 7.

The controller 12 generates the command signal for controlling the forward/reverse switching valve 5 (Step ST19). More specifically, the controller 12 causes the forward/reverse switching valve command generation unit 129 to generate the forward/reverse switching valve command.

The controller 12 outputs the command signal to the forward/reverse switching valve 5 (Step ST20). More specifically, the controller 12 causes the forward/reverse switching valve command generation unit 129 to output the forward/reverse switching valve command to the forward/reverse switching valve 5.

In this manner, the pressure control valve command based on the operation amount of the accelerator operation device 13 and the vehicle speed is output during the shuttle shift operation. The forward/reverse switching valve command for switching the forward/reverse switching valve 5 is changed by the command signal for starting the shuttle shift control or the pressure control valve command. That is, the switching timing of the forward/reverse switching valve 5 is controlled based on the operation amount of the accelerator operation device 13 and the vehicle speed.

<Effect>

As described above, the deceleration until the vehicle speed is reversed can be adjusted in accordance with the operation amount of the accelerator operation device 13 during the shuttle shift in the embodiment. In the embodiment, the timing for switching the forward/reverse switching valve 5 is determined based on the operation amount of the accelerator operation device 13. In the embodiment, the parameter for generating the command signal for controlling the pressure control valve 7 is determined based on the operation amount of the accelerator operation device 13. As a result, the pump displacement changes depending on the operation amount of the accelerator operation device 13. In this manner, the actual deceleration of the vehicle until the vehicle speed is reversed during the shuttle shift can be brought close to the deceleration desired by the operator according to the embodiment. According to the embodiment, the deceleration can be adjusted in accordance with an operation of the operator during the shuttle shift. According to the embodiment, in a case where a load is mounted on the working equipment 52 and the shuttle shift is performed, a rapid change in the vehicle speed is restricted as the operator reduces the operation amount of the accelerator operation device 13, so that the occurrence of a load spill can be suppressed. According to the embodiment, in a case where the shuttle shift is performed in a state where there is no load on the working equipment 52, the shuttle shift can be performed quickly as the operator increases the operation amount of the accelerator operation device 13.

<Modification>

The work vehicle 50 is the wheel loader in the above embodiment, but is not limited thereto. For example, it may be an HST-type forklift or bulldozer.

Other Embodiments

Although it has been described that the pressure control valve command is generated based on the operation amount of the accelerator operation device 13 and the parameter setting information stored in the storage unit 121 in the above embodiment, the invention is not limited thereto. For example, filter processing may be performed on the command signal of the pressure control valve 7 stored in advance in the controller 12 using the parameter determined based on the operation amount of the accelerator operation device 13 and the parameter setting information stored in the storage unit 121. More specifically, the parameter determination unit 125 determines a parameter for performing the filter processing on the command signal based on the operation signal from the accelerator operation amount sensor 13a and the parameter setting information stored in the storage unit 121. The pressure control valve command generation unit 128 performs the filter processing on the command signal of the pressure control valve 7 stored in advance based on the shuttle shift command from the shuttle shift control determination unit 124 and the parameter determined by the parameter determination unit 125. In this case, for example, when a filter is a low-pass filter, the parameter determination unit 125 may determine a cutoff frequency based on the operation signal input from the accelerator operation amount sensor 13a with reference to the parameter setting information stored in the storage unit 121.

Although both the forward/reverse switching valve 5 and the pressure control valve 7 are controlled based on the operation amount of the accelerator operation device in the above embodiment, only the forward/reverse switching valve 5 may be controlled. This can be implemented by the forward/reverse switching valve command for switching the forward/reverse switching valve 5 when the shuttle shift command is turned OFF.

REFERENCE SIGNS LIST

1 ENGINE
3 CHARGE PUMP
4 TRAVEL HYDRAULIC PUMP (HST PUMP)
5 FORWARD/REVERSE SWITCHING VALVE
6 PUMP DISPLACEMENT CONTROL CYLINDER
7 PRESSURE CONTROL VALVE
10 TRAVEL HYDRAULIC MOTOR (HST MOTOR)
11a MOTOR CYLINDER
11b MOTOR DISPLACEMENT CONTROL UNIT
12 CONTROLLER
13 ACCELERATOR OPERATION DEVICE (FIRST OPERATION DEVICE)
13a ACCELERATOR OPERATION AMOUNT SENSOR
14 FORWARD/REVERSE OPERATION DEVICE (SECOND OPERATION DEVICE)
16 VEHICLE SPEED SENSOR
17 PRESSURE DETECTION UNIT
17a FIRST CIRCUIT PRESSURE SENSOR
17b SECOND CIRCUIT PRESSURE SENSOR
20 HYDRAULIC CIRCUIT
20a FIRST CIRCUIT
20b SECOND CIRCUIT
30 TRAVEL SYSTEM
32 PUMP PILOT CIRCUIT
33 CHARGE CIRCUIT
34 MOTOR PILOT CIRCUIT
41 FIRST CHECK VALVE
42 SECOND CHECK VALVE
43 FIRST RELIEF VALVE
44 SECOND RELIEF VALVE
45 LOW-PRESSURE RELIEF VALVE
46 SHUTTLE VALVE
47 CUTOFF VALVE
48 CHECK VALVE
49 CHECK VALVE
50 WHEEL LOADER (WORK VEHICLE)
51 VEHICLE BODY
52 WORKING EQUIPMENT
55 WHEEL
56 CAB
57 DISPLAY UNIT
121 STORAGE UNIT
122 NEUTRAL DETERMINATION UNIT
123 SHUTTLE SHIFT DETERMINATION UNIT
124 SHUTTLE SHIFT CONTROL DETERMINATION UNIT
125 PARAMETER DETERMINATION UNIT
128 PRESSURE CONTROL VALVE COMMAND GENERATION UNIT
129 FORWARD/REVERSE SWITCHING VALVE COMMAND GENERATION UNIT
X THRESHOLD

The invention claimed is:

1. A work vehicle comprising:
a power source;
a hydraulic pump driven by the power source;
a pump displacement control cylinder that controls a displacement of the hydraulic pump in accordance with a pressure of supplied hydraulic fluid and switches a discharge direction of the hydraulic fluid from the hydraulic pump in accordance with a supply direction of the supplied hydraulic fluid;
a forward/reverse switching valve that switches the supply direction of the hydraulic fluid to the pump displacement control cylinder;
a pressure control valve that controls the hydraulic fluid supplied to the pump displacement control cylinder;
a vehicle speed sensor that detects a vehicle speed of the work vehicle;
a first operation device operated to control the power source;
a second operation device operated to switch forward travel and reverse travel of the work vehicle; and
a controller,
wherein the controller
determines whether or not a shuttle shift operation is performed based on the vehicle speed detected by the vehicle speed sensor and a command signal from the second operation device,
controls the forward/reverse switching valve based on an operation amount of the first operation device when determining that the shuttle shift operation is performed, and
controls the pressure control valve based on the operation amount of the first operation device when determining that the shuttle shift operation is performed.

2. The work vehicle according to claim 1, wherein the controller controls the forward/reverse switching valve based on the vehicle speed.

3. A method for controlling a work vehicle, which includes:
   a power source,
   a hydraulic pump driven by the power source,
   a pump displacement control cylinder that controls a displacement of the hydraulic pump in accordance with a pressure of supplied hydraulic fluid and switches a discharge direction of the hydraulic fluid from the hydraulic pump in accordance with a supply direction of the supplied hydraulic fluid,
   a forward/reverse switching valve that switches the supply direction of the hydraulic fluid to the pump displacement control cylinder, and
   a pressure control valve that controls the hydraulic fluid supplied to the pump displacement control cylinder, the method comprising:
   detecting a vehicle speed of the work vehicle;
   receiving a command signal from a second operation device operated to switch between forward travel and reverse travel of the work vehicle;
   determining whether or not a shuttle shift operation is performed based on the vehicle speed of the work vehicle and the command signal from the second operation device;
   controlling the forward/reverse switching valve based on an operation amount of a first operation device operated by an operator to control the power source when it is determined that the shuttle shift operation is performed; and
   controlling the pressure control valve based on the operation amount of the first operation device when determining that the shuttle shift operation is performed.

* * * * *